United States Patent

[11] 3,536,082

| [72] | Inventor | Charles H. Kolbeck<br>105 W. Grantosa Drive, Wauwatosa,<br>Wisconsin 53222 |
|---|---|---|
| [21] | Appl. No. | 760,249 |
| [22] | Filed | Sept. 17, 1968<br>Continuation-in-part of Ser. No. 649,660,<br>June 28, 1967, |
| [45] | Patented | Oct. 27, 1970 |

[54] CONTACT LENS CASE
1 Claim, 9 Drawing Figs.

[52] U.S. Cl. .................................................. 134/137,
206/5
[51] Int. Cl. ........................................... A45c 11/04,
B08b 3/04
[50] Field of Search ................................. 134/137,
143, 154, 166, 201; 206/5(A): 99/415, 416, 410;
15/214

[56] References Cited
UNITED STATES PATENTS

| 2,944,661 | 7/1960 | Goldstein | 206/5(A)UX |
|---|---|---|---|
| 2,967,607 | 1/1961 | Hollinger | 206/5(A)UX |
| 3,168,100 | 2/1965 | Rich | 206/5(A)UX |
| 3,268,068 | 8/1966 | Le Grand | 206/5(A)UX |
| 3,314,533 | 4/1967 | Kopfle | 206/5(A)UX |
| 3,394,717 | 7/1968 | Hollinger | 206/5(A)UX |
| 3,444,868 | 5/1969 | Hungerford et al. | 206/5(A)UX |
| 3,460,552 | 8/1969 | Sturgeon | 206/5(A)UX |

*Primary Examiner*—Daniel Blum
*Attorney*—Arthur J. Hansmann

ABSTRACT: A contact lens case including a base piece and a cap for fluid-tightly containing contact lenses. The base piece has a pocket which receives a basket having two compartments or sections for holding the contact lenses. The basket is completely removable from the base piece, and it has openings for the passage of fluid through the basket for soaking the lenses when they are in the base piece which contains lens fluid, and the basket is for rinsing the lenses when the basket is removed from the base piece.

Patented Oct. 27, 1970 3,536,082
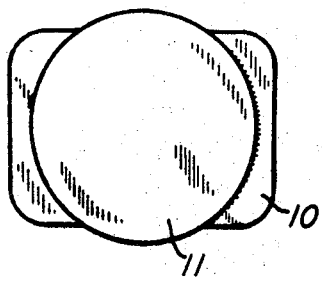
FIG. 1
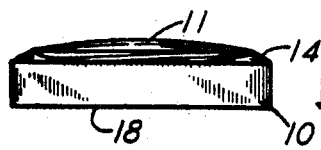
FIG. 2
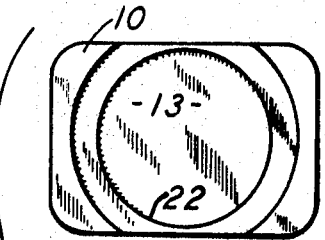
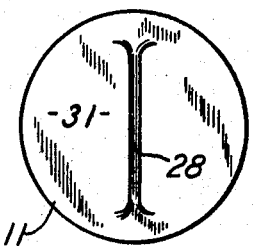
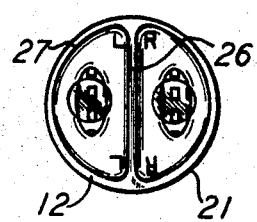
FIG. 3
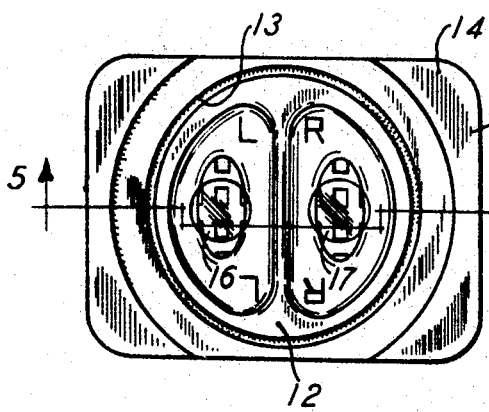
FIG. 4
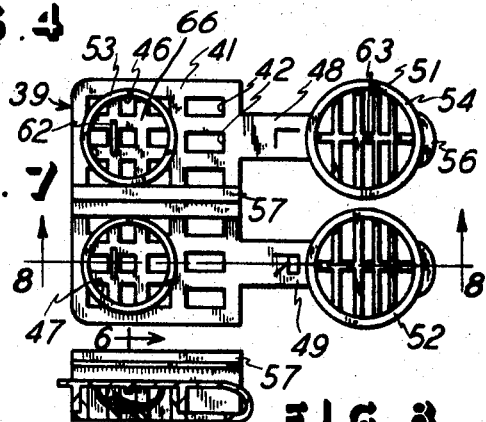
FIG. 7
FIG. 8
FIG. 9
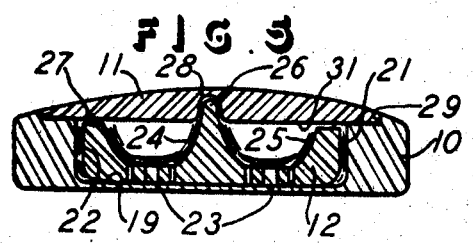
FIG. 5
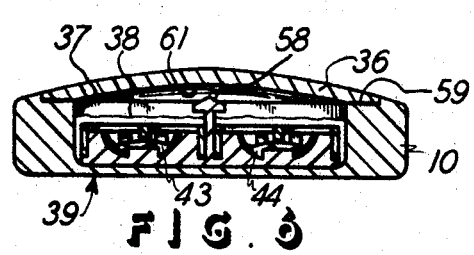
FIG. 6
INVENTOR:
CHARLES H. KOLBECK
ATTORNEY

3,536,082

CONTACT LENS CASE

This is a continuation-in-part of U.S. Pat. application Ser. No. 649,660, filed June 28, 1967, now abandoned.

BACKGROUND OF THE INVENTION

This invention relates to a contact lens case. Prior contact lens cases are commonly made to include the main or body portion which has two pockets for receiving the respective contact lenses. The pockets may or may not have a removable basket into which the lenses are placed for handling in inserting and removing them from the body piece. Also, the known cases are fluid tight for retaining the lenses in a fluid of a type which conditions and cleans the lenses which are then immersed in the fluid for soaking.

In the aforementioned prior art lens cases, they are generally made of four, five, or even six separate parts. This includes the main body piece, two baskets, one for each lens, and two caps. These prior lens cases required that each of the caps be removed separately so that there can be access to the two lenses. Still further, these lens cases have the caps on opposite ends of the body piece, and the body piece must be turned end-for-end so that each lens can be inserted or removed. Also, prior lens cases with a single cap and a basket are generally complicated in construction and limited in use, particularly in the use for rinsing the lenses.

It is a general object of this invention to improve the contact lens cases, and to do so with a case which is compact, simplified in manufacture, has only a minimum of parts, and is easy to manipulate and handle for storage and removal of the lenses.

In accomplishing the aforementioned object, the lens case of this invention has only three pieces, namely, the base piece, the basket, and a single cover, all for accommodating the two lenses within the case.

Still other objects of this invention include the provision of a lens case which is more easily cleaned and less subject to becoming contaminated, and it is therefore more hygienic than the cases known heretofore.

Still other objects include the provision of a case which will securely rest on a flat surface without moving or rolling, fits neatly into a pocket in a person's clothing, is less bulky than prior cases, is arranged to accommodate a large thread between the cap and the body piece so that the cap can be fluid-tightly secured, and has a long life span because of its size, and the entire case is easier to handle and to use in the insertion and removal of the lenses.

BRIEF DESCRIPTION OF THE DRAWING

FIG. 1 is a top plan view of a preferred embodiment of a case of this invention.

FIG. 2 is the side elevational view of FIG. 1.

FIG. 3 is an exploded view showing the three separate parts of the case in FIG. 1.

FIG. 4 is an enlarged top plan view of FIG. 1 with the cap removed.

FIG. 5 is a sectional view taken along the line 5–5 of FIG. 4, with the cap added thereto.

FIG. 6 is a sectional view similar to FIG. 5 but showing another embodiment of this case, and with the view being taken along the line 6–6 of FIG. 8, with the outer body and cap added thereto.

FIG. 7 is a top plan view of the basket shown in FIG. 6, and with the caps in the open position.

FIG. 8 is a sectional view taken along the line 8–8 of FIG. 7, but with the caps in the closed position.

FIG. 9 is a sectional view similar to FIG. 8, but showing a different embodiment of the basket.

DETAILED DESCRIPTION OF THE PREFERRED EMBODIMENTS

The contact lens case shown consists of the body piece 10, the cap 11 and the basket 12. Only these three pieces are utilized in presenting the complete construction of this case.

The body piece 10 has a single and a circularly shaped opening 13 in the top portion. Thus the body 10 has a top surface 14 which is commonly on the upper side when the case is in a position for insertion or removal of the lenses 16 and 17. Also, the case has a flat or planar surface 18 forming the bottom surface of the body 10.

Thus the pocket 13 forms a compartment which extends through the greater portion of the body 10, and the basket 12 is removably received in the compartment 13. FIG. 5 shows that the body piece 10 has a floor 19 on which the bottom of the basket 12 will rest. Also, the basket 12 is shown to be cylindrically shaped, and its circumference 21 is disposed immediately adjacent the circumferencial wall 22 defining the compartment 13. Also, the compartment 13 will retain a lens fluid, and the basket 12 has openings 23 for passage of the fluid into the two separate pockets or compartments 24 and 25 of the basket 12. Thus the basket 12 is in the nature of a strainer, and it is marked to designate the left and right lenses, and such marking may be by different coloring of the walls of the compartments 24 and 25, or it may be by the imprinting of the letters L and R, such as shown clearly in FIG. 4 where the letters are directly on the basket 12.

A divider or partition 26 extends centrally across the basket 12 to define the left and right compartments 24 and 25. Also, the partition 26 serves as a grip or handle for moving the basket into and out of the body 10 when the user grips the outstanding partition 26 between two fingers. Thus the partition 26 extends above the remainder of the basket 12, and it particularly extends above the basket surface extending around the basket periphery and designated 27 in FIG. 5.

The cap 11 is recessed at its central portion, as designated 28. The recess 28 accommodates and receives the partition 26 as shown in FIG. 5. The cap 11 is shown to be of a diameter slightly greater than the width of the body piece 10, as indicated in FIG. 1. Thus the cap 11 can readily rotate with respect to the body piece 10 by means of the user's thumb and forefinger engaging the overhanging portions of the cap 11. The screw threads are provided between the body piece 10 and the cap 11 and along the mating surfaces designated 29 in FIG. 5. Thus the cap 11 is threaded into the body 10 to be fluid tight therewith. Also, the lower surface 31 of the cap 11 is disposed immediately adjacent the basket upper surface 27 to retain the lenses 16 and 17 in their respective compartments, as desired.

The entire case is therefore fluid tight when the cap is applied and the lenses cannot move from their respective positions, even though the case may be tipped or shook. Also, removal of the cap and the basket will permit the base piece 10 to be properly and easily cleaned, as well as the cap 11 and the basket 12. Still further, the basket 12 can be removed from the piece 10 without requiring that the user touch the fluid in which the basket is immersed, so the fluid remains hygienically clean. Since only a single cap 11 is required for closing the case, the cap has a long life and provides the desired fluid tightness because the threads between the cap and body piece 10 can be sufficiently large along the line designated 29 where the threads are located intermediate the two pieces.

Still further, the height of the case from the lower surface 18 to the upper surface 14, and through the top of the cap 11, is only a small fraction of the width of the case. That is, the case is flat and compact by virtue of its construction in the pieces mentioned, particularly in the requirement of only three pieces, as described.

FIGS. 6 through 8 show another embodiment of the case, and here it will be seen that the base piece 10 has a cap 36 fluid tight with the piece 10, and the cap 36 may be threaded onto the piece 10 or otherwise made fluid tight therewith. The base piece 10 also has a recess or pocket 37 which contains lens fluid, as shown by the wavey line 38 indicating the level of the fluid in the pocket 37. Thus, the piece 10 again has its single pocket 37, and it fluid-tightly contains the lens fluid, when the cap 36 is applied to the base piece 10, and it also supports the basket, generally designated 39. FIG. 7 shows the basket 39 is made of a base material 41 having the plurality of perforations 42 for the flow of fluid through the basket and the base piece 41. Of course the entire basket may be made of a plastic material, and it is therefore suitable for holding the lenses, indicated at 43 and 44 in FIG. 6. That is, the basket has two compartments 46 and 47 which are upwardly open and provided for respectively containing the left lens 43 and the right lens 44. Thus the indicators L and R are shown on flexible connectors 48 and 49, respectively extending between the body portion 41 and the respective caps 51 and 52. Thus it will be understood that the caps 51 and 52 can be moved from the positions shown in FIG. 7 to the positions shown in FIGS. 6 and 8. The compartments 46 and 47 are defined by upstanding rings 53 extending above the basket base portion 41, and the base portion 41 below the compartments 46 and 47, as viewed in FIG. 7, also has the fluid passageways or openings 42 so that lens fluid and rinsing water can flow through the compartments 46 and 47 and onto the lenses 43 and 44.

Thus the caps 51 and 52 may be pressure-retained or snapped onto the rings 53, as the cap rings 54 are snug with the compartment rings 53, as shown in FIGS. 6 and 8. This securely retains the lenses in the compartments 46 and 47, until the user desires to remove the caps or open the basket to the FIG. 7 position. Tabs 56 are secured to the cap rings 54 for permitting removal of the caps from the rings 53 by light pressure from the user's finger.

A partition 57, which also serves as a handle, extends between the compartments 46 and 47 and substantially thereabove, as shown in FIGS. 6 and 8. Therefore, in FIG. 6, the upper end 58 of the partition 57 is above the uppermost horizontal level 59 of the base piece pocket 37, and therefore the upper end 58 of the handle 57 is always above the fluid line 38. That is, the cap 36 is recessed along the surface 61 to permit upward extension or projection of the handle upper end 58 for the purpose mentioned. This permits the user to grip the handle 57 between two fingers, and remove the basket 39 from the base piece 10 for taking the lenses to a water faucet for rinsing the cleaning fluid from the basket and the lenses. This rinsing is done before the caps 51 and 52 are placed in the open position, and therefore the user does not put his fingers into the lens solution in the base piece 10, nor does the user touch the lenses while they are being rinsed by the water. This is an important hygienic advantage in this basket 39.

Then, after rinsing, the user can open the caps 51 and 52 and he can pick up the lenses by sliding the finger under the lens so that the concave side of the lens is untouched by the finger and is directed upwardly as the lens rests on the tip of an inverted finger. The user can then apply a drop of ophthalmolic fluid on the concave surface of the lens, and the lens can then be inserted directly into the eye. All of this is accomplished without touching the concave portion of the lens, which of course is the portion against the user's eyeball when the lens is inserted. To permit picking up the lens from the basket without touching the concave side, a projection 62 extends along the basket base portion 41 in the area of the pockets 46 and 47. This tips the lens which is resting against the projection 62, in the position shown in FIG. 8, and it permits the user to place the very tip of the finger below the lens and slide the finger underneath the lens so that the lens can be lifted out of the pocket, as mentioned. Also, the caps 51 and 52 have projections 63 which extend downwardly toward the lens or the center of the respective compartments 46 and 47, and these projections 63 therefore prevent capillary attraction between the caps and the lenses, so the lenses remain in the bottom of the compartments or against the base portion 41, as shown and as desired when the caps 51 and 52 are being opened.

FIG. 9 shows a somewhat different arrangement of a basket, and here the shown basket is designated 64, and it is the same as the basket 39 except that it does not have the raised projection 62, and it does not have the downwardly extending tip or projection 63. Thus FIG. 9 shows the lens 44 to be inverted from the positions previously described, and, upon opening the cap 52 the user can place the tip of the finger directly downwardly on the lens upper surface, which upper surface is now the convex surface. The lens then adheres to the finger and can be inverted to have the concave side upwardly, simply by rotating the hand but without requiring that the user touch the concave side of the lens. Again, ophthalmolic solution can then be applied to the now upwardly faced concave surface of the lens, and the lens can then be inserted into the user's eye. Therefore, the basket can be made to have a floor 66 on the basket bottom or base portion 41 and defining the compartments 46 and 47, and the lens can rest on the floor and either be spaced somewhat thereabove, by means of the projection 62, or it can be inverted, as shown in FIG. 9 where it is resting on the floor. In either case, the concave side of the lens is not touched by the user, and the lens can be removed from the basket because there is no capillary attraction or other suction force which would cause the lens to adhere to the floor. Also, the important point is that the basket provides a convenient, safe, and hygienically clean means for rinsing the lenses under the water faucet, without having to handle the lens and endanger the surface of the lens or contaminate the lens or even lose the lens down the drain provided for the water.

I claim:

1. In a contact lens case, a base piece having a bottom portion and a top portion and pocket means extending downwardly into said top portion for fluid-tightly containing contact lenses in a lens fluid, a single cap releasably attached to said base piece for fluid-tightly sealing with said base piece and extending over said pocket means, basket means freely disposed in said pocket means and being fully removable from said base piece and out of said pocket means and having two upwardly open separate compartments for separately receiving and upwardly supporting said lenses and with said basket means being immersible in said lens fluid and having openings for the passage of said lens fluid through said basket means, the improvement comprising a partition included in said basket means and extending centrally across said basket means between said compartments, said partition extending on said basket means in the upward direction away from said compartments to a location adjacent said top and above the uppermost level of said pocket means to be above the level of said lens fluid when said pocket means is completely filled with said lens fluid and with said partition being adaptable to be gripped by the user's fingers for removal of said basket means upwardly from said base piece and completely out of said pocket means, a separately movable cover movably attached to said basket means and being releasably snapped into lens-retaining position with each of said compartments, each of said covers having openings for the flow of fluid therethrough and into said compartments.